C. A. BAILEY.
Educational Appliance.
No. 203,988.  Patented May 21, 1878.
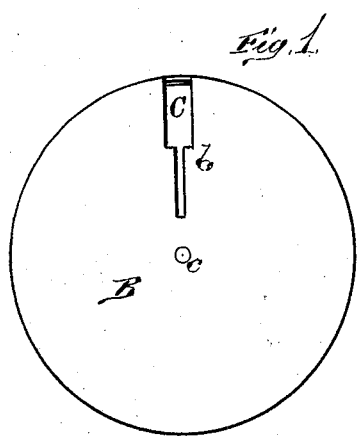
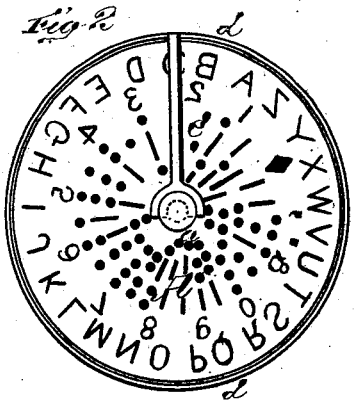
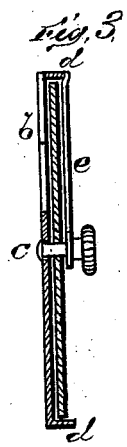
WITNESSES
H. Bates
F. J. Mast
INVENTOR
Chas. A. Bailey,
by E. W. Anderson,
ATTORNEY

UNITED STATES PATENT OFFICE.

CHARLES A. BAILEY, OF COBALT, CONNECTICUT.

IMPROVEMENT IN EDUCATIONAL APPLIANCES.

Specification forming part of Letters Patent No. 203,988, dated May 21, 1878; application filed April 20, 1878.

*To all whom it may concern:*

Be it known that I, CHARLES A. BAILEY, of Cobalt, in the county of Middlesex and State of Connecticut, have invented a new and valuable Improvement in Educational Indicators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a front view of my invention. Fig. 2 is a rear view of the same, and Fig. 3 is a central vertical section.

This invention has relation to educational indicators; and it has for its object, mainly, to teach children to readily recognize and use letters and figures.

It consists in the construction and novel arrangement of a revolving disk having one or more concentric series of letters, or figures, or both, stamped in it, or otherwise formed so as to be apparent in front and upon the back, and, in connection therewith, a slotted disk or indicator in front and guide in rear, as hereinafter fully shown and described.

In the accompanying drawings, the letter A designates the revolving disk, having one or more series of letters and figures stamped therein, and arranged in concentric circles, as shown. To the center of this disk is attached a handle, a, having usually a milled edge, so as to be readily turned by the fingers. B indicates the front guard-plate, which is radially slotted, as shown at b, the slot being of sufficient width to enable a single letter, figure, or sign to be seen through it, when brought opposite, by turning the disk A. To the center of this guard-plate the letter-disk A is pivoted, as indicated at c, and the edge d of said plate is flanged backward to guard the free edge of said disk and prevent the same from being readily tampered with. This flange also serves as a means whereby the left hand can grasp the article without interfering with the rotation of the letter-disk or obscuring the slot b, through which the letters are designed to be seen.

In order to afford a guide to the operator in rear of the letter-disk, a radial indicator or bar, e, is attached to the rim of plate B, and extends to the central stud or handle a, which is provided with a groove or neck to engage its forked end and prevent it from becoming disarranged. This indicator e is placed precisely in rear of the slot b of the guard-plate, so that when, by the rotation of the disk A, any letter or figure is brought under said indicator on the back, it will also appear in front of the disk through the sight-slot. For use in schools it may be made on a large scale.

Having described this invention, what I claim, and desire to secure by Letters Patent, is—

1. The revolving letter-indicators, consisting of the revolving letter-disk A, its radially-slotted guard-plate B, the rim-flange d, indicator e, handle a, and pivot, substantially as specified.

2. A revolving letter-indicator, having in front a radially-slotted guard-plate, in rear an indicator radially arranged opposite the sight-slot of the guard-plate, and between the two the revolving letter-disk, having its letters or figures similarly arranged in front and rear, substantially as specified.

In testimony that I claim the above I have hereunto subscribed my name in the presence of two witnesses.

CHAS. A. BAILEY.

Witnesses:
H. S. RAMSDELL,
JOHN CARRIER.